(12) United States Patent
La Fratta et al.

(10) Patent No.: US 12,411,625 B2
(45) Date of Patent: *Sep. 9, 2025

(54) PORT ARBITRATION

(71) Applicant: Micron Technology, Inc., Boise, ID (US)

(72) Inventors: Patrick A. La Fratta, McKinney, TX (US); Shashank Adavally, Austin, TX (US); Jeffrey L. Scott, Apex, NC (US); Robert M. Walker, Raleigh, NC (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/767,519

(22) Filed: Jul. 9, 2024

(65) Prior Publication Data

US 2024/0361933 A1 Oct. 31, 2024

Related U.S. Application Data

(63) Continuation of application No. 17/903,743, filed on Sep. 6, 2022, now Pat. No. 12,056,375.

(51) Int. Cl.
*G06F 3/06* (2006.01)

(52) U.S. Cl.
CPC .......... *G06F 3/0635* (2013.01); *G06F 3/0604* (2013.01); *G06F 3/0659* (2013.01); *G06F 3/0679* (2013.01)

(58) Field of Classification Search
CPC ........ G06F 3/06; G06F 9/4881; G06F 9/4887; G06F 9/5038; G06F 13/1263; G06F 13/362; G06F 2209/5021

See application file for complete search history.

(56) References Cited

U.S. PATENT DOCUMENTS

| | | |
|---|---|---|
| 5,440,752 A | 8/1995 | Lentz et al. |
| 6,199,127 B1 | 3/2001 | Ajanovic |
| 7,421,559 B1 | 9/2008 | Yadav |
| 7,913,022 B1 | 3/2011 | Baxter |
| 8,867,303 B2 | 10/2014 | Hu et al. |
| 9,183,042 B2 * | 11/2015 | Hagspiel ................. G06F 9/467 |
| 2003/0172104 A1 | 9/2003 | Hooman et al. |
| 2006/0161740 A1 * | 7/2006 | Kottapalli ............. G06F 9/3834 |
| | | 711/152 |
| 2014/0304456 A1 | 10/2014 | Narasimha et al. |
| 2019/0109787 A1 | 4/2019 | Chen et al. |
| 2022/0019360 A1 | 1/2022 | La Fratta |

* cited by examiner

*Primary Examiner* — Khoa D Doan

(74) *Attorney, Agent, or Firm* — Brooks, Cameron & Huebsch, PLLC

(57) ABSTRACT

Apparatuses and methods related to port arbitration of a memory system are described. A memory system can receive a first number of transactions and a second transaction from a first traffic stream and a third number of transactions and a fourth transaction from a second traffic stream. The memory system can process the first number of transactions at least partially concurrently with the third number of transactions. Responsive to a total quantity of transactions of the first number of transactions and the second transaction being at least a threshold quantity of transactions, the second transaction can be processed by the memory system and, subsequent to processing the second transaction, the fourth transaction can be processed by the memory system.

19 Claims, 10 Drawing Sheets

PORT ARBITRATION

PRIORITY INFORMATION

This application is a Continuation of U.S. application Ser. No. 17/903,743, filed Sep. 6, 2022, the contents of which are included herein by reference.

TECHNICAL FIELD

The present disclosure relates generally to memory devices, and more particularly, to devices and methods related to port arbitration of a memory system.

BACKGROUND

Memory devices are typically provided as internal, semiconductor, integrated circuits in computers or other electronic devices. There are many different types of memory including volatile and non-volatile memory. Volatile memory can require power to maintain its data and includes random-access memory (RAM), dynamic random access memory (DRAM), and synchronous dynamic random access memory (SDRAM), among others. Non-volatile memory can provide persistent data by retaining stored data when not powered and can include NAND flash memory, NOR flash memory, read only memory (ROM), Electrically Erasable Programmable ROM (EEPROM), Erasable Programmable ROM (EPROM), and resistance variable memory such as phase change random access memory (PCRAM), resistive random access memory (RRAM), and magnetoresistive random access memory (MRAM), among others.

Memory is also utilized as volatile and non-volatile data storage for a wide range of electronic applications. Non-volatile memory may be used in, for example, personal computers, portable memory sticks, digital cameras, cellular telephones, portable music players such as MP3 players, movie players, and other electronic devices. Memory cells can be arranged into arrays, with the arrays being used in memory devices.

DETAILED DESCRIPTION

Figure 1:
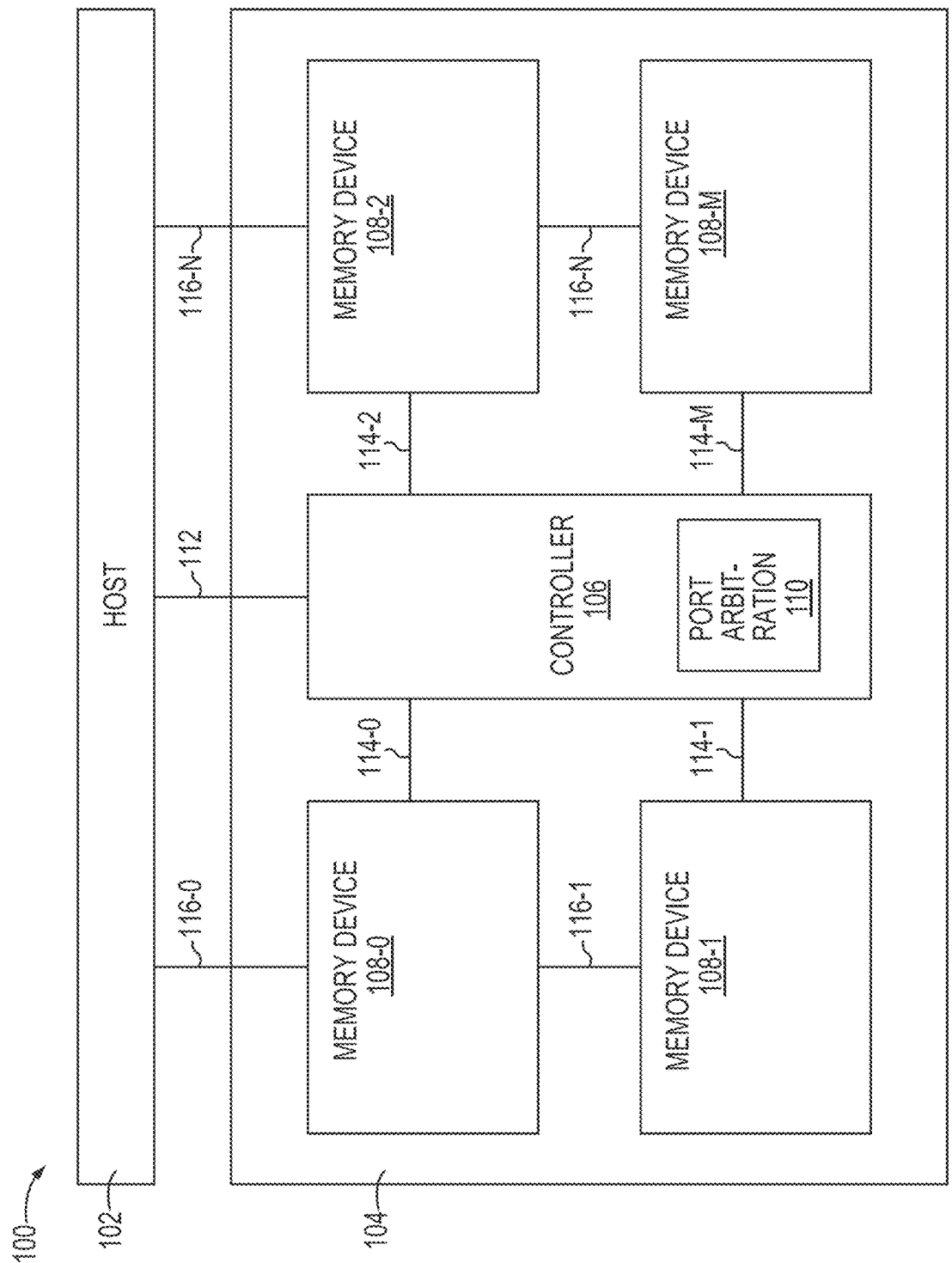
FIG. 1 is a block diagram illustrating an example apparatus in the form of a computing system including a host and a memory system with port arbitration circuitry in accordance with a number of embodiments of the present disclosure.

The present disclosure includes apparatuses and methods related to port arbitration of a memory system. As used herein, "port arbitration" refers to throttling (e.g., application and/or release of backpressure) of one or more traffic streams received by a memory system (e.g., at one or more ports of a memory system). As used herein, "port arbitration circuitry" refers to circuitry (e.g., logic) of a memory system configured to perform operations associated with port arbitration of the memory system. As used herein, "backpressure" refers to prevention of internal communication of transactions and/or processing of transactions from one or more traffic streams received by a memory system (e.g., at one or more ports of a memory system). As used herein, "transactions" refer to requests and/or commands, such as read commands or write commands, communicated to a memory system from a component coupled thereto (e.g., a host).

A memory system can receive transactions from one or more independent traffic streams. As used herein, a "traffic stream" refers to a series of transactions (e.g., access requests) sent to and received by a memory system from a particular source (e.g., a traffic generator). Non-limiting examples of sources of traffic streams include a single process or thread executing on an individual core in a central processing unit (CPU), multiple processes or threads executing on an individual core in a CPU, multiple processes or threads executing on multiple cores in a CPU, or multiple processes or threads executing on multiple cores in multiple CPUs. In various embodiments, a memory system can connect to hardware via a high-speed expansion bus, such as Compute Express Link (CXL), and include traffic streams from one or more CPUs and/or accelerators. Non-limiting examples of accelerators include graphics processing units (GPUs) and application-specific compute accelerators.

A traffic stream can be independent from another traffic stream in that a source of one traffic stream can be a process and/or thread having a progression that is not a function of a state of another process and/or thread that is a source of the other traffic stream. Some previous approaches may include control circuitry of a memory system that does not distinguish transactions among different incoming traffic streams in scheduling of internal communication and/or processing of the transactions. However, it can be desirable to allocate more resources of the memory system to one traffic stream (and transactions received therefrom) than another traffic stream (and transactions received therefrom).

As a conceptual example, consider a memory system that receives transactions from two traffic streams associated with two respective processes: process A and process B. Process A is performing an update to data associated with an application stored on the memory system. Process B is servicing a request to execute real-time stock trades that includes communication of data stored on the memory system to a server for execution of the real-time stock trades. While the memory system will take several minutes to complete processing transactions associated with process A, the memory system will take mere seconds (or fractions thereof) to complete processing transactions associated with process B. An important distinction between processing of the transactions associated with processes A and B is that a delay of a minute or two, or even more, in processing of the transactions associated with process A will result in no major consequence to the memory system (or a user thereof). But a delay of just five or ten seconds in processing of the transactions associated with process B could be critically problematic in that the stock trades may not be executable after the delay due to the real-time changes in the stock market.

Embodiments of the present disclosure address the above deficiencies and other deficiencies of previous approaches by providing a capability of a memory system to distinguish between multiple traffic streams (and transactions received therefrom) to allocate more resources of the memory system to transactions from one or more traffic streams than transactions from one or more other traffic streams. In contrast to some previous approaches that arbitrate incoming traffic streams according to a static policy such as round-robin, embodiments of the present disclosure include port arbitration of a memory system that arbitrate incoming traffic streams according to dynamic policies. The dynamic policies, which can be user-defined via user-configurable parameters, throttle incoming traffic streams in real-time.

As used herein, the singular forms "a," "an," and "the" include singular and plural referents unless the content clearly dictates otherwise. Furthermore, the word "may" is used throughout this application in a permissive sense (i.e., having the potential to, being able to), not in a mandatory sense (i.e., must). The term "include," and derivations thereof, mean "including, but not limited to." The term "coupled" means directly or indirectly connected.

The figures herein follow a numbering convention in which the first digit or digits correspond to the drawing figure number and the remaining digits identify an element or component in the drawing. Similar elements or components between different figures may be identified by the use of similar digits. Analogous elements within a figure may be referenced with a hyphen and extra numeral or letter. See, for example, elements 216-0, 216-1 . . . , 216-N in FIG. 2. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate certain embodiments of the present invention and should not be taken in a limiting sense.

FIG. 1 is a block diagram of an apparatus in the form illustrating an example computing system 100 including a host 102 and a memory system 104 with port arbitration circuitry 110 in accordance with a number of embodiments of the present disclosure. As used herein, a computing system 100, a host 102, a memory system 104, or a memory device 108, for example, might also be separately considered to be an "apparatus."

In this example, the computing system 100 includes the host 102 coupled to the memory system 104 via an interface. The interface can pass control, address, data, and/or other signals between the memory system 104 and the host 102. The interface can include a command/address bus 112 and data buses 116-0, . . . , 116-N (referred to collectively as the data buses 116). The data buses 116 are also referred to as ports 116 herein. In some embodiments, the command/address bus 112 can be comprised of separate command and address buses. In some embodiments, the command/address bus 112 and the ports 116 can be part of a common bus. The command/address bus 112 can pass signals from the host 102 to the controller 106 such as clock signals for timing, reset signals, chip selects, addresses for the memory devices 108, parity information, etc. The command/address bus 112 can be used by a controller 106 to send alert signals to the host 102. The command/address bus 112 can be operated according to a protocol. The interface can be a physical interface employing a suitable protocol. Such a protocol can be custom or proprietary, or the interface can employ a standardized protocol, such as Peripheral Component Interconnect Express (PCIe), Gen-Z interconnect, cache coherent interconnect for accelerators (CCIX), etc. In some cases, the controller 106 can be a register clock driver (RCD), such as RCD employed on an RDIMM or LRDIMM.

The computing system 100 can be a personal laptop computer, a desktop computer, a digital camera, a mobile telephone, a memory card reader, or an Internet-of-Things (IoT) enabled device, among various other types of systems. For clarity, the computing system 100 has been simplified to focus on features with particular relevance to the present disclosure. The host 102 can include a number of processing resources (e.g., one or more processors, microprocessors, or some other type of controlling circuitry) capable of accessing the memory system 104.

The memory system 104 can provide main memory for the computing system 100 or could be used as additional memory or storage throughout the computing system 100. Each of memory devices 108-0, 108-1, 108-2, . . . , 108-M (referred to collectively as the memory devices 108) can be a separate memory die, which may also be referred to as a chip. Each of the memory devices 108 can include one or more arrays of memory cells. By way of example, the memory system 104 can be a dual in-line memory module (DIMM) including the memory devices 108 operated as double data rate (DDR) DRAM, such as DDR5, a graphics DDR DRAM, such as GDDR6, or another type of memory system. Embodiments are not limited to a particular type of memory system 104. Other examples of memory devices include RAM, ROM, SDRAM, PCRAM, RRAM, flash memory, and three-dimensional cross-point, among others. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased.

FIG. 1 illustrates the memory devices 108-0 and 108-1 coupled to the port 116-0 and the memory devices 108-2 and 108-M coupled to the port 116-N. However, embodiments of the present disclosure are not so limited. In some embodiments, one or more of the ports 116 can be coupled to the controller 106 rather than the memory devices 108 (as described in association with FIG. 2). In some embodiments, each of the memory devices 108 can be coupled to or (if not coupled to) associated with a respective one of the ports 116. In some embodiments, multiple ones of the ports 116 can be coupled to the same memory device. The ports 116 can provide data for read/write operations between the host 102 and the memory system 104.

The memory system 104 can include a controller 106 coupled to the memory devices 108 via respective channels 114-0, 114-1, 114-2, . . . , 114-M (referred to collectively as the channels 114). The controller 106 can be implemented as hardware, firmware, and/or software. For example, the controller 106 can be an application specific integrated circuit (ASIC) coupled to a printed circuit board including a physical interface. The controller 106 can relay, via the channels 114, command and/or address signals from the command/address bus 112 from the host 102 to the memory devices 108, and vice versa. The controller 106 can relay, via the channels 114, data from the host 102 received via the ports 116 to the memory devices 108, and vice versa. In some embodiments, the controller 106 may perform command and/or address translation of the command and/or address signals from the host 102 before relaying the same to the memory devices 108. The controller 106 can operate the channels 114 with a same or different protocol than that with which the command/address bus 112 is operated between the host 102 and the memory system 104. The controller 106 can use the channels 114 to send command and/or address signals, clock signals, select signals, and other related signals to the memory devices 108. The memory devices 108 can use the channels 114 to send error signals, reset signals, and other related signals to the controller 106. The controller 106 thus provides access to the memory devices 108 for the host 102. Examples of the commands for the memory devices 108 include read, write, erase, refresh, and refresh management commands for data on the memory devices 108, among other commands. The memory system 104 can include separate integrated circuits, or both the controller 106 and the memory devices 108 can be on the same integrated circuit.

As illustrated by FIG. 1, the controller 106 can include port arbitration circuitry 110. Particular components, and arrangement thereof, of embodiments of the port arbitration circuitry 110 are described further in association with FIGS. 4 and 8. Although not specifically illustrated, the port arbitration circuitry 110 can include one or more registers configured to store a data value indicative of a threshold quantity of transactions one of the ports 116, which can be a user-configurable data value, and a data value indicative of a quantity of transactions received by the port. The port arbitration circuitry 110 can cause the data value indicative of the quantity of transactions received by the port to be incremented for each transaction received by the port and decremented for each response to a transaction sent from the port. The quantity of transactions received can be the same as or indicative of a quantity of outstanding transactions that processing of which, by the memory system 104, has yet to be complete.

Although not specifically illustrated, the controller 106 can include an on-die storage array to store and/or change default settings for the memory devices 108. The registers of the port arbitration circuitry 110 can be read and/or written based on commands from the host 102 and/or the controller 106. The registers can include some individual registers that are "reserved for future use" (RFU) as part of a device specification. The RFU registers can be used to fill the role described herein for the registers. For example, the registers can, at least initially, store data values indicative of threshold quantities of transactions. Those data values can be changed by rewriting the registers.

The port arbitration circuitry 110 can be configured to determine whether the data value indicative of the quantity of transactions received by one of the ports 116 is greater than or equal to the data value indicative of the threshold quantity of transactions for the port. The port arbitration circuitry 110 can be configured to apply backpressure to the port in response to signaling indicative of the data value indicative of the quantity of transactions received by the port being greater than or equal to the data value indicative of the threshold quantity of transactions for the port. The port arbitration circuitry 110 can be configured to release the backpressure to the port in response to different signaling indicative of the data value indicative of the quantity of transactions received by the port being less than the data value indicative of the threshold quantity of transactions for the port.

Figure 2:
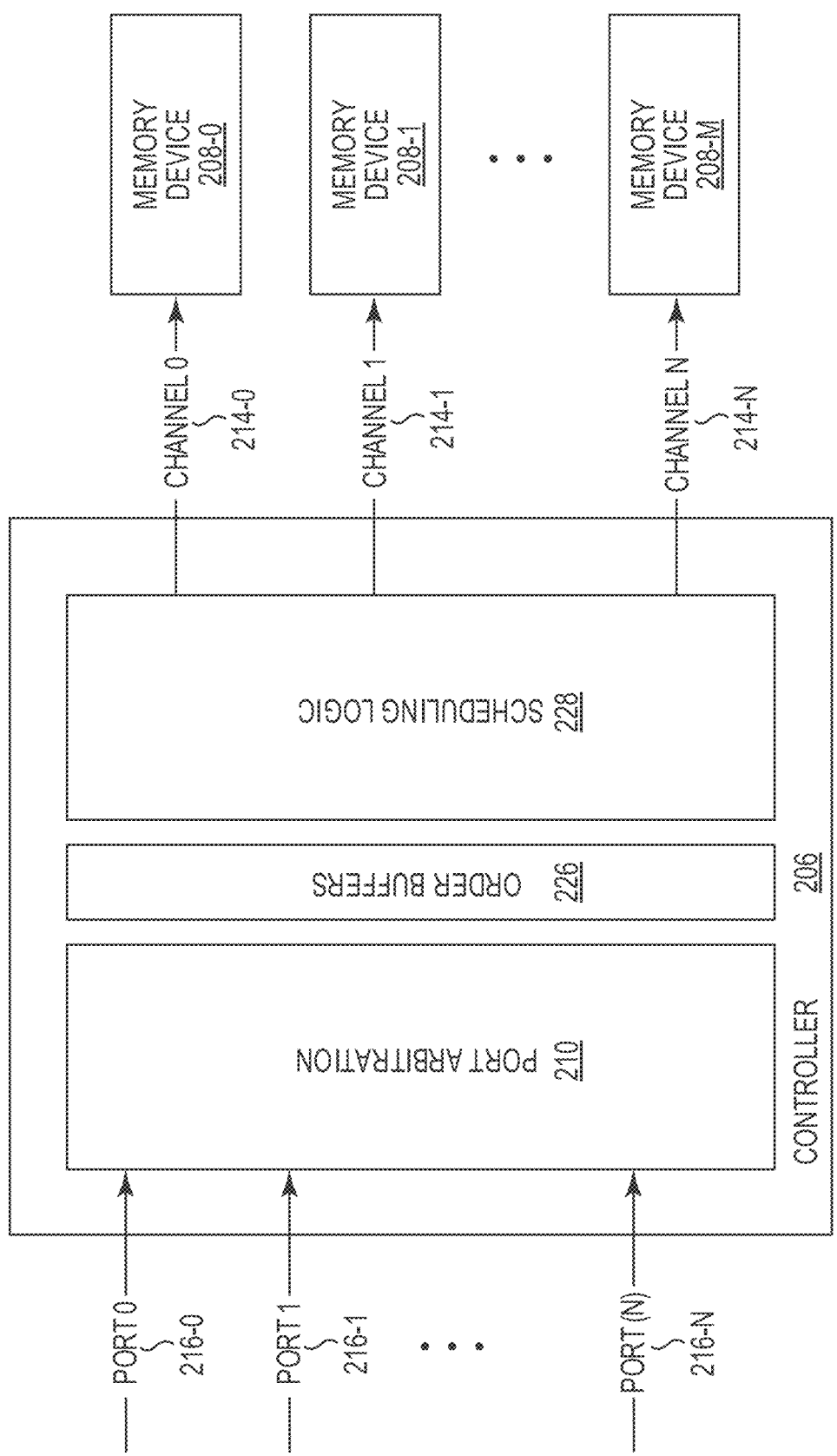
FIG. 2 is a block diagram illustrating an example controller with port arbitration circuitry coupled to a number of memory devices in accordance with a number of embodiments of the present disclosure.

FIG. 2 is a block diagram illustrating an example controller 206 with port arbitration circuitry 210 coupled to a number of memory devices in accordance with a number of embodiments of the present disclosure. The controller 206, the port arbitration circuitry 210, and the memory devices 208-0, 208-1, . . . 208-N (referred to collectively as the memory devices 208) can be analogous to the controller 106, the port arbitration circuitry 110, and the memory devices 108, respectively, described in association with FIG. 1. For clarity, the controller 206 illustrated by FIG. 2 has been simplified to focus on features with particular relevance to the present disclosure.

Traffic streams can be received by a front end of the controller 206 via one or more of the ports 216-0, 216-1, . . . , 216-N (referred to collectively as the ports 216). The controller 206 can enable one or more of the ports 216. The traffic streams can "contend" for resources of the memory system and/or the controller 206. For example, the controller 206 can include and/or be coupled to one or more order buffers 226. The controller can arbitrate slots of the order buffers 226. The order buffers 226 can include a fixed quantity of slots (e.g., amount of storage space) for incoming transactions from the traffic streams. Each slot of the order buffers 226 stores one transaction. When a transaction is received by the controller 206, the controller 206 can allocate a slot of the order buffers 226 for the transaction. When a response associated with completion of processing a transaction is generated by the memory system (e.g., written to a response buffer (not shown in FIG. 2)), the controller 206 can deallocate a slot of the order buffers 226 allocated to the transaction. The controller 206 can include scheduling logic 228 for communication of instructions and/or data to and/or from one or more of the memory devices 208 as part of processing transactions received from the traffic streams. The port arbitration circuitry 210 directs selection and/or enabling of the ports 216. The scheduling logic 228 directs communication (when to communicate and/or to which of the memory devices 208) of commands, received by the controller 206 (e.g., via the ports 216) to the memory devices 208 (e.g., via the channels 214), regardless at which of the ports 216 the commands were received.

Some previous approaches to port arbitration may include arbitration according to a round-robin policy. Consider an example where a traffic stream from a high-priority process and another traffic stream from a low-priority process are constant (e.g., a same amount of data every nanosecond). According to a round-robin policy, each traffic stream utilizes approximately equal (the same) average bandwidth. Although such fairness in resource allocation may be desirable if both traffic streams are of equal priority, even allocation of resources may not be desired with traffic streams of different priorities as in this example. It can be desirable for more of the available memory bandwidth to be allocated to a high-priority traffic stream and less of the available memory bandwidth to be allocated to a low-priority traffic stream.

Consider another example of port arbitration according to a round-robin policy where a traffic stream from a high-priority process and another traffic stream from a low-priority process are variable (e.g., a different amount of data every nanosecond). Variable traffic streams might be received by a memory system when a high-priority process enters some compute-intensive or network-intensive section of code, for instance. Each traffic stream may utilize available bandwidth roughly evenly when transactions are received by the memory system from both traffic streams concurrently. As used herein, "concurrently" refers to performing an operation performed by two or more components at approximately or nearly the same time and does not require the components to commence and/or cease performance of the operation at the same time. In some examples, "concurrently" refers to operations performed within a common time period or number of clock cycles defined by an industry standard, specification, datasheet, or the like. However, when different quantities of transactions are received by the memory system from the respective traffic streams, such as when no transactions are received from the high-priority traffic stream and transactions are received from the low-priority traffic stream, the low-priority traffic stream may utilize all of the available bandwidth. This can be problematic when bandwidth is subsequently needed to process one or more transactions from the high-priority traffic stream but is unavailable due to ongoing processing of transactions from the low-priority traffic stream.

Figure 3:
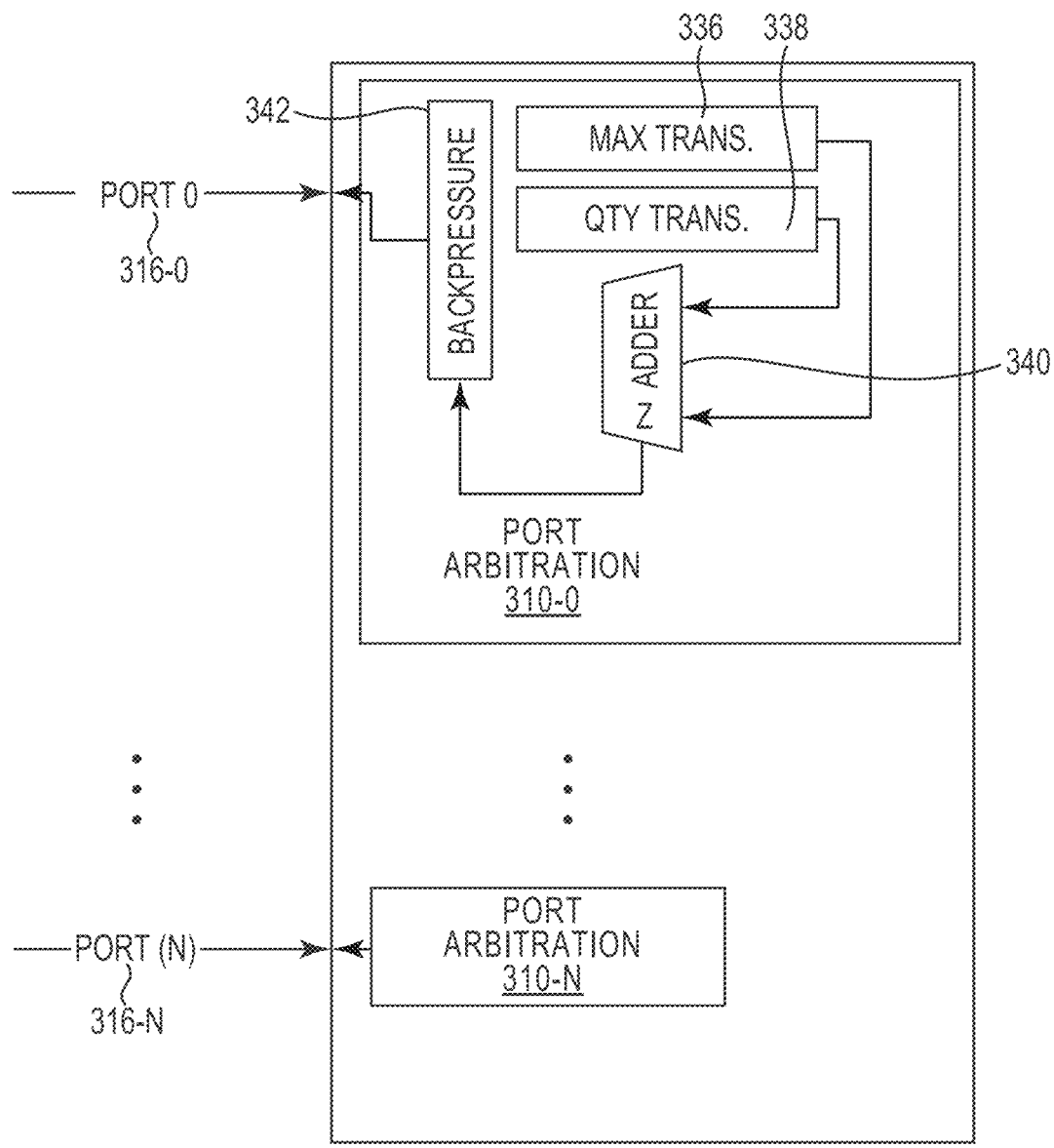
FIG. 3 is a block diagram illustrating an example of port arbitration circuitry of a memory system in accordance with a number of embodiments of the present disclosure.

FIG. 3 is a block diagram illustrating an example of port arbitration circuitry 310 of a memory system in accordance with a number of embodiments of the present disclosure. In a number of embodiments, and as shown in FIG. 3, the port arbitration circuitry can be implemented as a number of port arbitration circuitry instances 310-0, . . . , 310-N (referred to collectively as the port arbitration circuitry 310) corresponding to respective ports 316-0, . . . , 316-N (referred to collectively as the ports 316) of a memory system. The port arbitration circuitry 310 can be analogous to the port arbitration circuitry 110 and 210 described in association with FIGS. 1 and 2, respectively.

The port arbitration circuitry 310-0 can be associated with (e.g., coupled to) the port 316-0. The port arbitration circuitry 310-0 can include a register 336 configured to store a data value indicative of a threshold quantity (e.g., maximum) of transactions for the port 316-0 and another register 338 configured to store a data value indicative of a quantity of transactions received by the port 316-0. The data value stored by the register 338 can be incremented for each transaction received to the port 316-0 and decremented for each response to a transaction sent from the port 316-0.

The data value stored in the register 336 can be a user-configurable data value and indicative of a priority of the traffic stream received via the port 316-0. A higher threshold quantity of transactions can be indicative of a higher priority because, as described herein, backpressure would be applied to ports having a lower threshold quantity of transactions before backpressure would be applied to the port 316-0. In some embodiments, the threshold quantity of transactions can be based on a type of transactions received via the port 316-0.

The port arbitration circuitry 310-0 can include an adder 340 configured to receive the data values from the registers 336 and 338. The adder 340 can determine whether the quantity of transactions received by via the port 316-0 is greater than or equal to the threshold quantity of transactions. If the received quantity of transactions is greater than or equal to the threshold quantity of transactions, then the adder 340 can provide signaling to backpressure circuitry 342 of the port arbitration circuitry 310-0 coupled thereto. The backpressure circuitry 342 can include logic circuitry and is configured to apply backpressure to the port 316-0 in response to the signaling, from the adder 340, indicative of the received quantity of transactions being greater than or equal to the threshold quantity of transactions. The backpressure circuitry 342 can be configured to release the backpressure to the port 316-0 in response to different signaling (or lack thereof), from the adder 340, indicative of the received quantity of transactions being less than the threshold quantity.

The port arbitration circuitry 310-0 can be representative of the components and/or arrangement thereof of other port arbitration circuitry associated with or coupled to another port of the memory system (e.g., the port arbitration circuitry 310-N for the port 310-N). However, the respective threshold quantity of transactions for the ports 316 can be different (e.g., to reflect respective priority of traffic streams). In some embodiments, there may not be a 1:1 relationship between ports and port arbitration circuitry. For example, fewer than all ports of a memory system can have respective port arbitration circuitry associated therewith. In some embodiments, more than one port can be associated with port arbitration circuitry (e.g., via a multiplexer).

Figure 4:
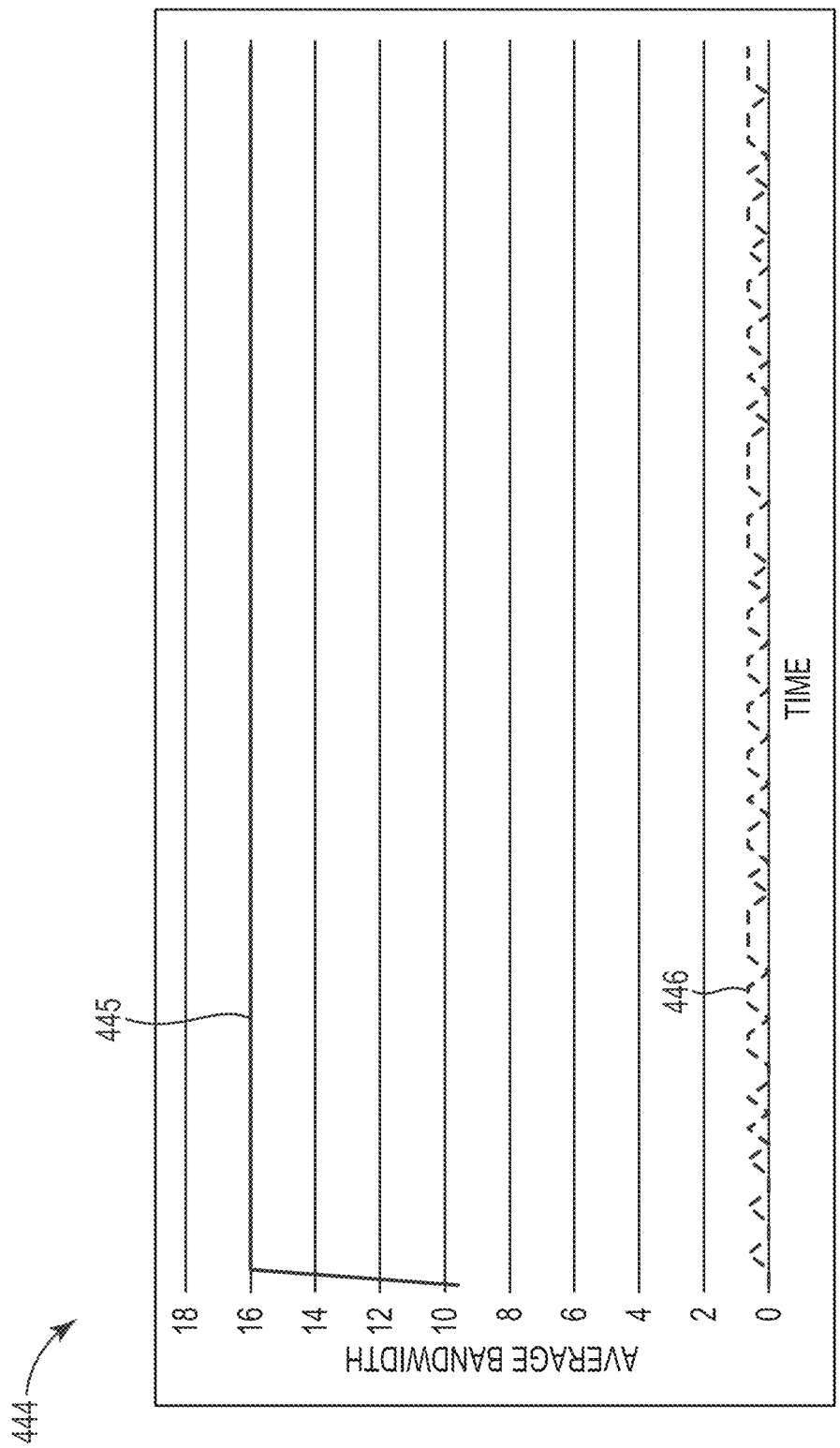
FIG. 4 is a graph illustrating average bandwidth of processing transactions received by a memory system including port arbitration associated with two constant traffic streams in accordance with a number of embodiments of the present disclosure.

FIG. 4 is a graph 444 illustrating average bandwidth of processing transactions received by a memory system including port arbitration circuitry 310 (described in association with FIG. 3) associated with two constant traffic streams in accordance with a number of embodiments of the present disclosure. The graph 444 illustrates the average bandwidth (amount of data transferred) on the y-axis and time on the x-axis. The line 445 (solid) corresponds to a traffic stream and the line 446 (dashed) corresponds to another traffic stream.

The graph 444 is representative of port arbitration using port arbitration circuitry 310. The traffic stream corresponding to the line 445 is from a high-priority process and the traffic stream corresponding to the line 446 is from a low-priority process. Both traffic streams are constant (e.g., a same amount of data every nanosecond). However, the threshold quantity of transactions for the high-priority traffic stream is 32 transactions and the threshold quantity of transactions for the low-priority traffic stream is 1 transaction.

As illustrated by the graph 444, the port arbitration circuitry 422 provides processing transactions from the high-priority traffic stream with the majority of the available bandwidth and processing transactions from the low-priority traffic stream with the remainder of the available bandwidth. Because the port arbitration circuitry 310 applies backpressure to the port of the memory system via which transactions from the low-priority traffic stream are received in response to 1 transaction from the low-priority traffic stream being processed, less resources of the memory system are consumed by processing transactions from the low-priority traffic stream. In contrast, because the port arbitration circuitry 310 does not apply backpressure to the port via which transactions from the high-priority traffic stream are received until 32 transactions from the high-priority traffic stream are being processed concurrently, more resources of the memory system are available for and consumed by processing multiple transactions from the high-priority traffic stream concurrently.

Figure 5:
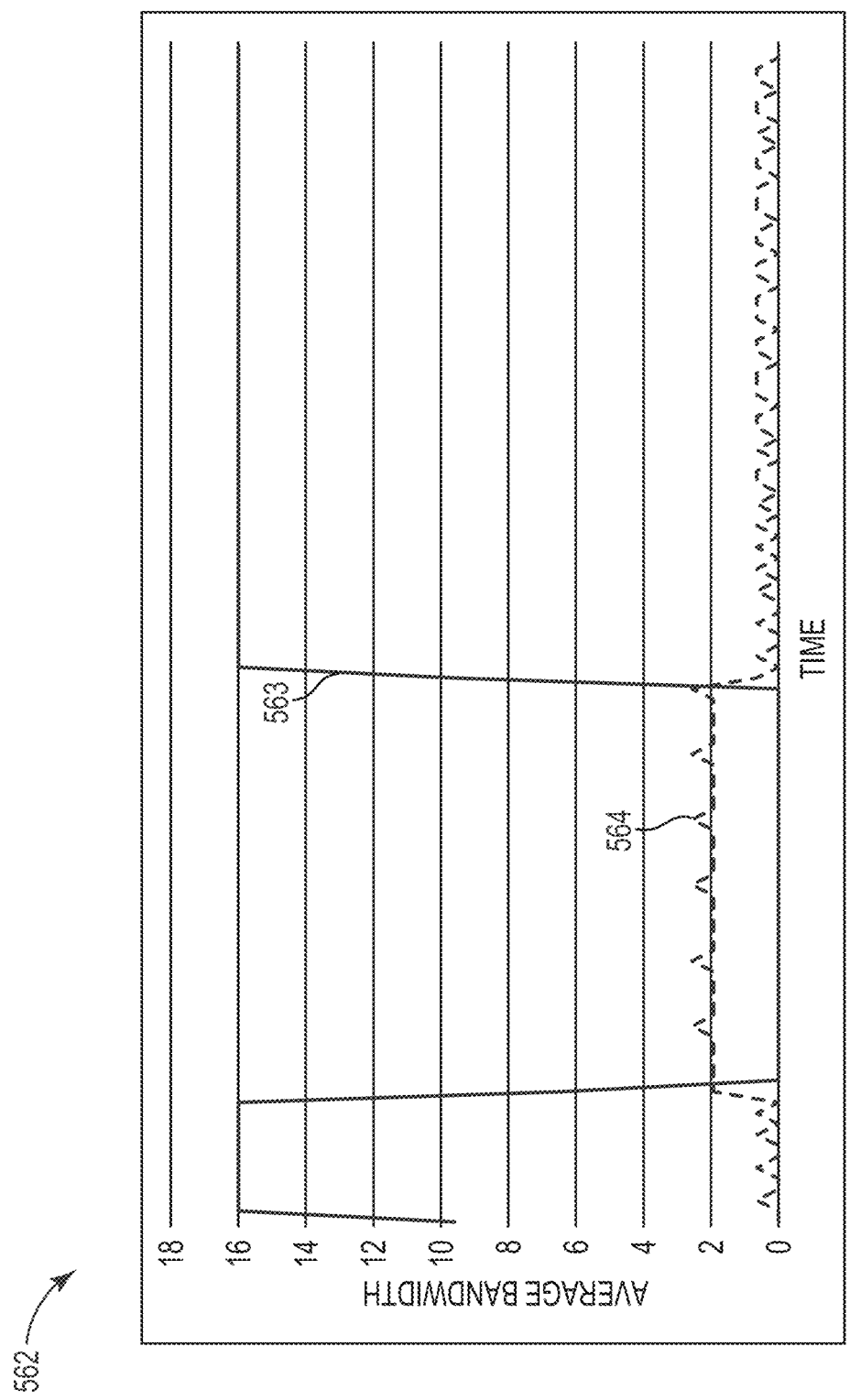
FIG. 5 is a graph illustrating average bandwidth of processing transactions received by a memory system including port arbitration circuitry associated with two variable traffic streams in accordance with a number of embodiments of the present disclosure.

FIG. 5 is a graph 562 illustrating average bandwidth of processing transactions received by a memory system including port arbitration circuitry 310 (described in association with FIG. 3) associated with two variable traffic streams in accordance with a number of embodiments of the present disclosure. The graph 562 illustrates the average bandwidth (amount of data transferred) on the y-axis and time on the x-axis. The line 563 (solid) corresponds to a traffic stream and the line 564 (dashed) corresponds to another traffic stream.

The graph 562 is representative of port arbitration using the port arbitration circuitry 310. The traffic stream corresponding to the line 563 is from a high-priority process and the traffic stream corresponding to the line 564 is from a low-priority process. Both traffic streams are variable (e.g., a different amount of data every nanosecond). However, the threshold quantity of transactions for the high-priority traffic stream is 32 transactions and the threshold quantity of transactions for the low-priority traffic stream is 1 transaction.

As illustrated by the graph 562, processing transactions from the high-priority traffic stream utilizes most of the available bandwidth when transactions are received by both traffic streams concurrently, as desired. However, when no transactions are received from the high-priority traffic stream, the available bandwidth may be vastly underutilized. Because the port arbitration circuitry 310 is applying backpressure to the port of the memory system via which transactions from the low-priority traffic stream are received in response to 1 Transaction from the low-priority traffic stream being processed. This may be suboptimal and may negatively affect the performance of the memory system.

Figure 6:
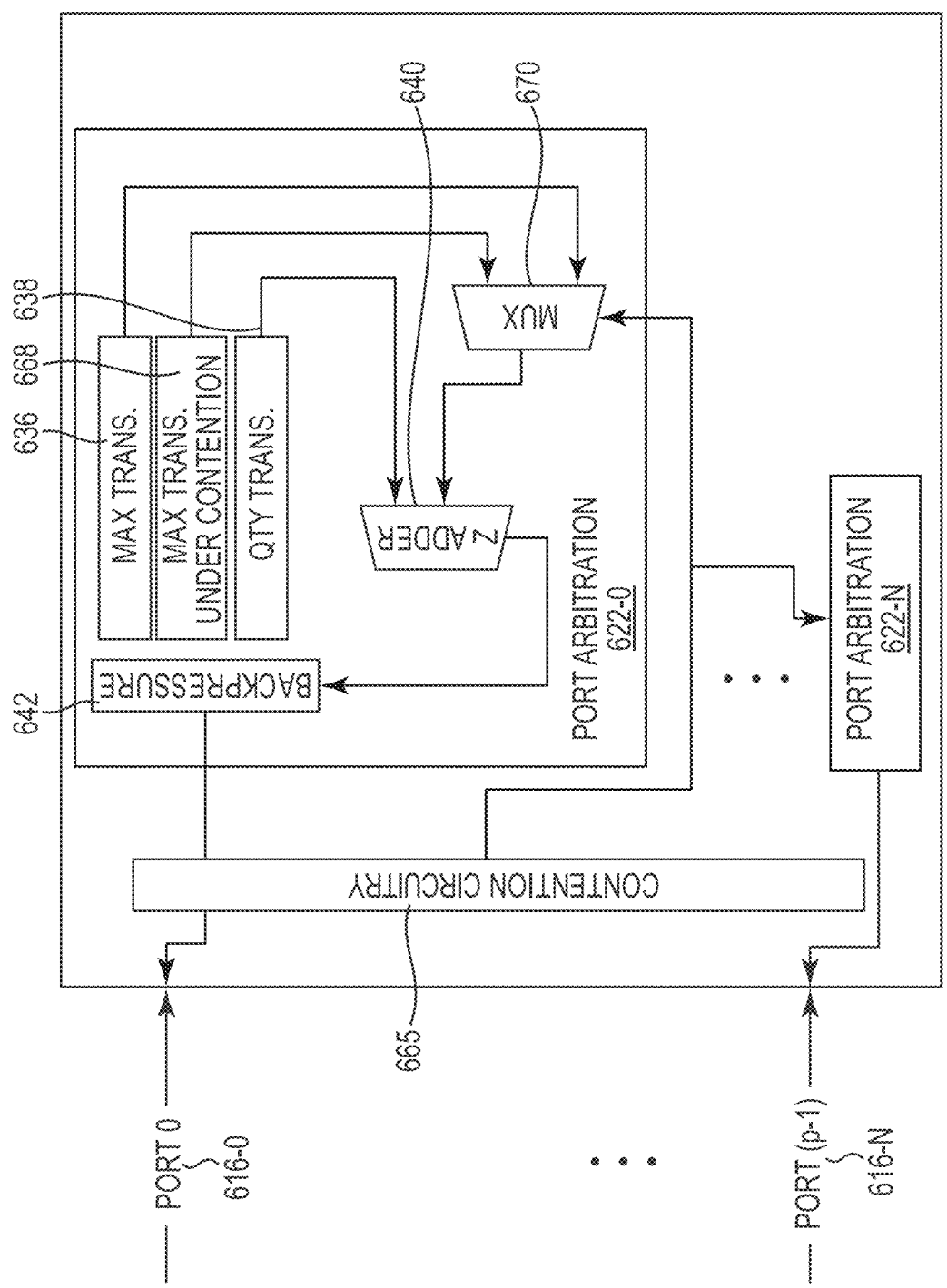
FIG. 6 is a block diagram illustrating an example of port arbitration circuitry of a memory system in accordance with a number of embodiments of the present disclosure.

FIG. 6 is a block diagram illustrating an example of port arbitration circuitry 622 of a memory system in accordance with a number of embodiments of the present disclosure. In a number of embodiments, and as shown in FIG. 6, the port arbitration circuitry can be implemented as a number of the port arbitration circuitry instances 622-0, . . . , 622-N (referred to collectively as port arbitration circuitry 622) corresponding to respective ports 616-0, . . . , 616-N (referred to collectively as the ports 616) of a memory system. The port arbitration circuitry 622-N can be analogous to the port arbitration circuitry 110, 210, and 310 described in association with FIGS. 1-3, respectively.

The port arbitration circuitry 622 differs from the port arbitration circuitry 310 in that another data value indicative of a different threshold quantity of transactions, referred to herein as a contention threshold quantity of transactions, is utilized by the port arbitration circuitry 622. This additional data value can be stored in the register 636, or in a different register 668. As illustrated by FIG. 6, the controller and/or the port arbitration circuitry 622 can include contention circuitry 665 that can include logic circuitry and be configured to detect when two or more of the ports 616 are receiving transactions from respective traffic streams concurrently. When such a situation is detected, the contention circuitry 665 can provide signaling to the port arbitration circuitry 622 so that the contention threshold quantity of transactions is used instead of the threshold quantity of transactions.

The port arbitration circuitry 622-0 can include a multiplexer 670 coupled to the registers 636 and 668. The multiplexer 670 can be configured to select either the data value indicative of the threshold quantity of transactions for the port 616-0 or the data value indicative of the contention threshold quantity of transactions for the port 616-0 based on signaling, from the contention circuitry 665, indicative of two or more of the ports 616 are receiving transactions from respective traffic streams concurrently. In some embodiments, the port arbitration circuitry 622 can include logic circuitry coupled to the registers 636 and 668, instead of the multiplexer 670, to select either the data value indicative of the threshold quantity of transactions for the port 616-0 or the data value indicative of the contention threshold quantity of transactions for the port 616-0 based on signaling from the contention circuitry 665.

The contention threshold quantity of transactions can be a user-configurable data value. The contention threshold quantity of transactions can be different than the threshold quantity of transactions. For example, the contention threshold quantity of transactions can be greater than the threshold quantity of transactions to reduce underutilization of resources of the memory system when backpressure is applied to one or more of the ports 616 to make more resources of the memory system available to higher priority traffic streams.

The port arbitration circuitry 622-0 can be representative of the components and/or arrangement thereof of other port arbitration circuitry associated with or coupled to another port of the memory system (e.g., the port arbitration circuitry 622-N for the port 616-N). However, the respective threshold quantity of transactions for the ports 616 can be different (e.g., to reflect respective priority of traffic streams). In some embodiments, there may not be a 1:1 relationship between ports and port arbitration circuitry. For example, fewer than all ports of a memory system can have respective port arbitration circuitry associated therewith. In some embodiments, more than one port can be associated with port arbitration circuitry (e.g., via a multiplexer).

Figure 7:
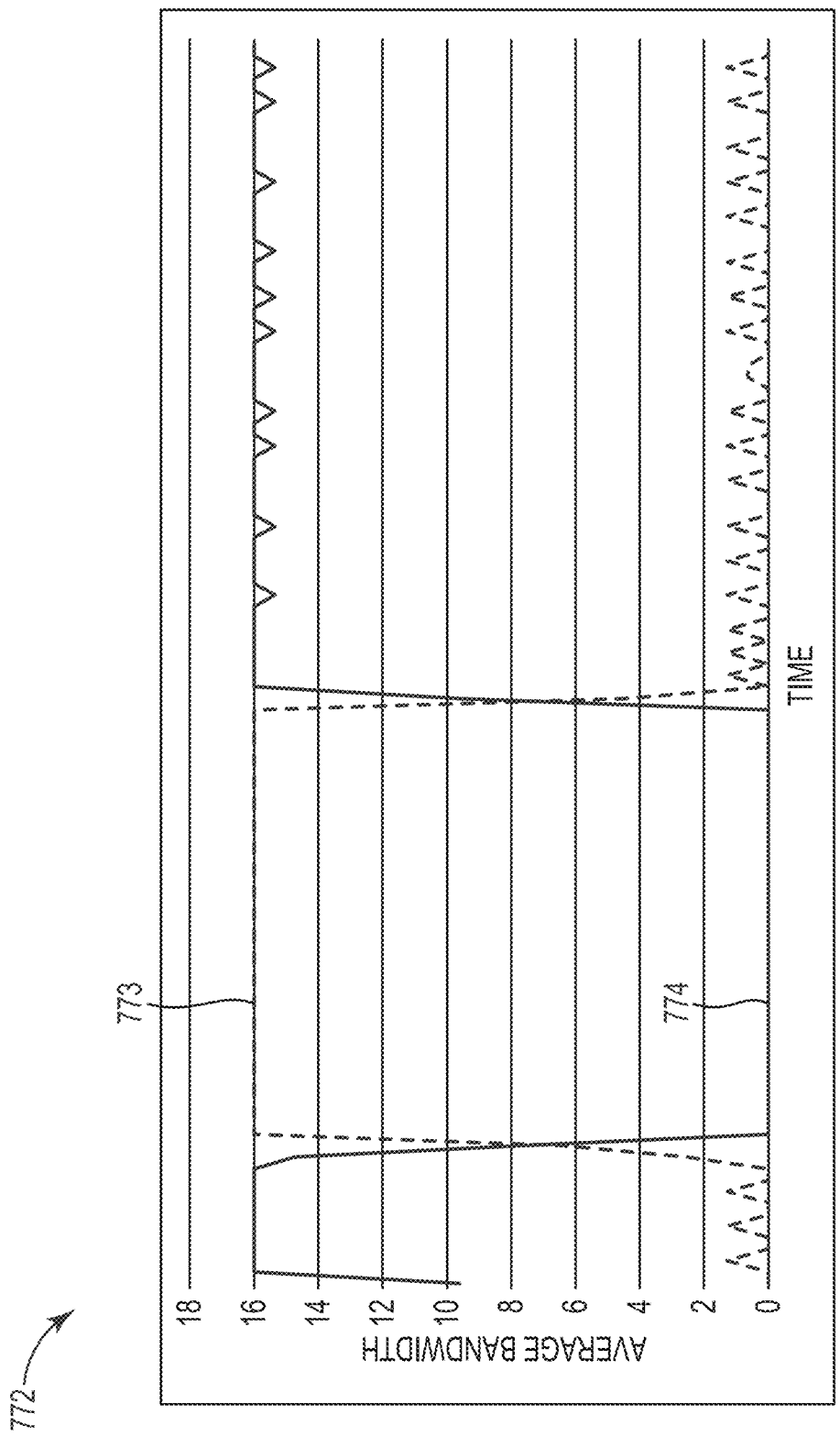
FIG. 7 is a graph illustrating average bandwidth of processing transactions received by a memory system including port arbitration circuitry associated with two variable traffic streams in accordance with a number of embodiments of the present disclosure.

FIG. 7 is a graph 772 illustrating average bandwidth of processing transactions received by a memory system including port arbitration circuitry 622 (described in association with FIG. 6) associated with two variable traffic streams in accordance with a number of embodiments of the present disclosure. The graph 772 illustrates the average bandwidth (amount of data transferred) on the y-axis and time on the x-axis. The line 774 (solid) corresponds to a traffic stream and the line 773 (dashed) corresponds to another traffic stream.

The graph 772 is representative of port arbitration using the port arbitration circuitry 622. The traffic stream corresponding to the line 774 is from a high-priority process and the traffic stream corresponding to the line 773 is from a low-priority process. Both traffic streams are variable (e.g., a different amount of data every nanosecond). The threshold quantity of transactions for both traffic streams are 32 transactions. However, the contention threshold quantity of transactions for the high-priority traffic stream is 32 transactions and the contention threshold quantity of transactions for the low-priority traffic stream is 1 transaction. As illustrated by the graph 772, when transactions are received from both traffic streams concurrently (by both ports concurrently), the port arbitration circuitry 622 uses the contention threshold quantities of transactions to provide processing transactions from the high-priority traffic stream with the majority of the available bandwidth and processing transactions from the low-priority traffic stream with the remainder of the available bandwidth. In contrast, when no transactions are received from the high-priority traffic stream such that the low-priority traffic stream is the only source of transactions, processing transactions from the low-priority traffic stream utilizes all of the available bandwidth because the port arbitration circuitry 622 uses the threshold quantities of transactions.

Figure 8:
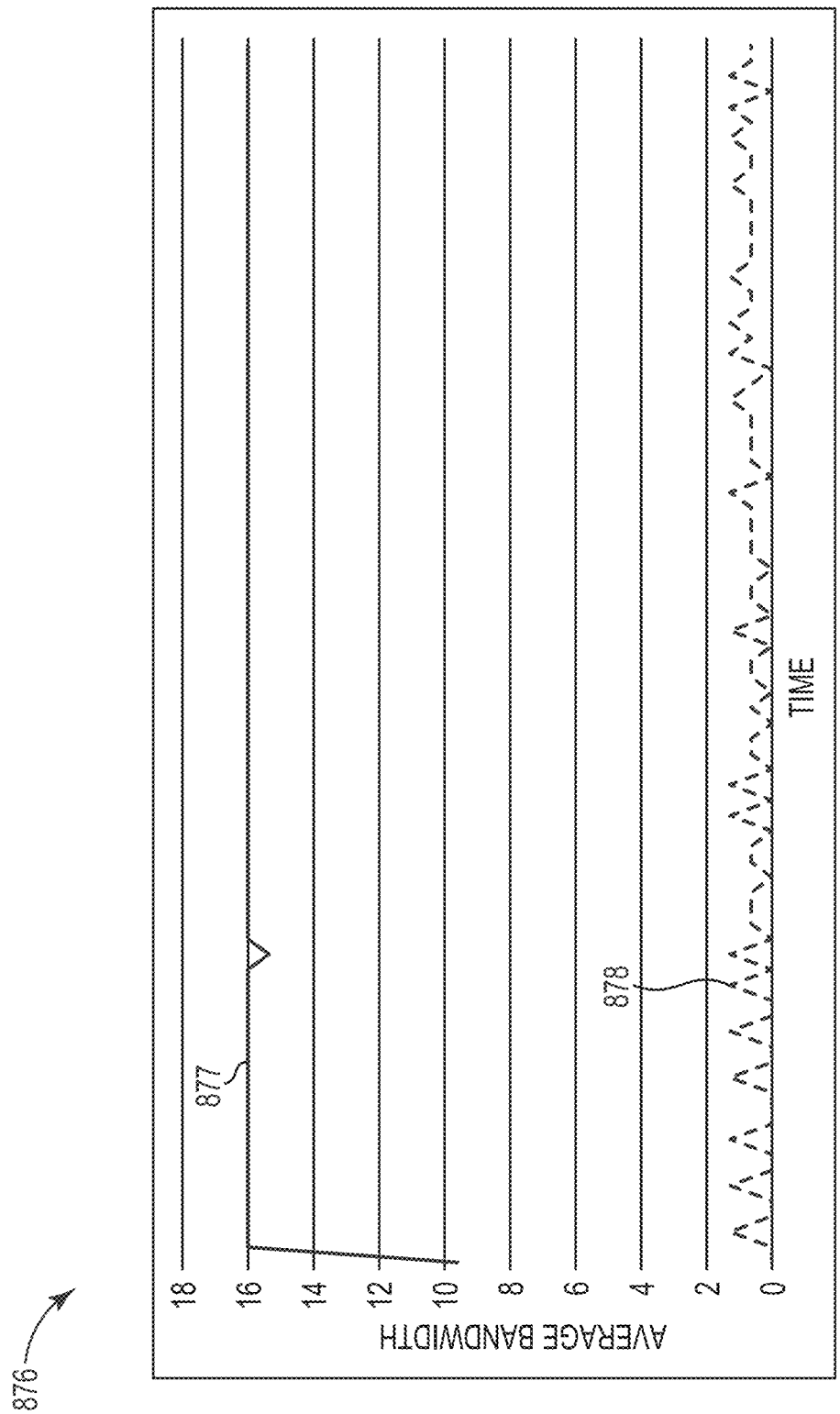
FIG. 8 is a graph illustrating average bandwidth of processing transactions received by a memory system including port arbitration circuitry associated with two constant traffic streams in accordance with a number of embodiments of the present disclosure.

FIG. 8 is a graph 876 illustrating average bandwidth of processing transactions received by a memory system including port arbitration circuitry 622 (described in association with FIG. 6) associated with two constant traffic streams in accordance with a number of embodiments of the present disclosure. The graph 876 illustrates the average bandwidth (amount of data transferred) on the y-axis and time on the x-axis. The line 877 (solid) corresponds to a traffic stream and the line 878 (dashed) corresponds to another traffic stream.

The graph 876 is representative of port arbitration using the port arbitration circuitry 622. The traffic stream corresponding to the line 877 is from a high-priority process and the traffic stream corresponding to the line 878 is from a low-priority process. Both traffic streams are constant (e.g., a same amount of data every nanosecond). The threshold quantity of transactions for both traffic streams are 32 transactions. However, the contention threshold quantity of transactions for the high-priority traffic stream is 32 transactions and the contention threshold quantity of transactions for the low-priority traffic stream is 1 transaction. When transactions are not received from both traffic streams concurrently (by both ports concurrently), the port arbitration circuitry 622 uses the threshold quantities of transactions to provide equal; access to the available bandwidth. As illustrated by the graph 876, processing of transactions from the high-priority traffic stream utilizes most of the available bandwidth and processing transactions from the low-priority traffic stream utilizes the remainder.

Figure 9:
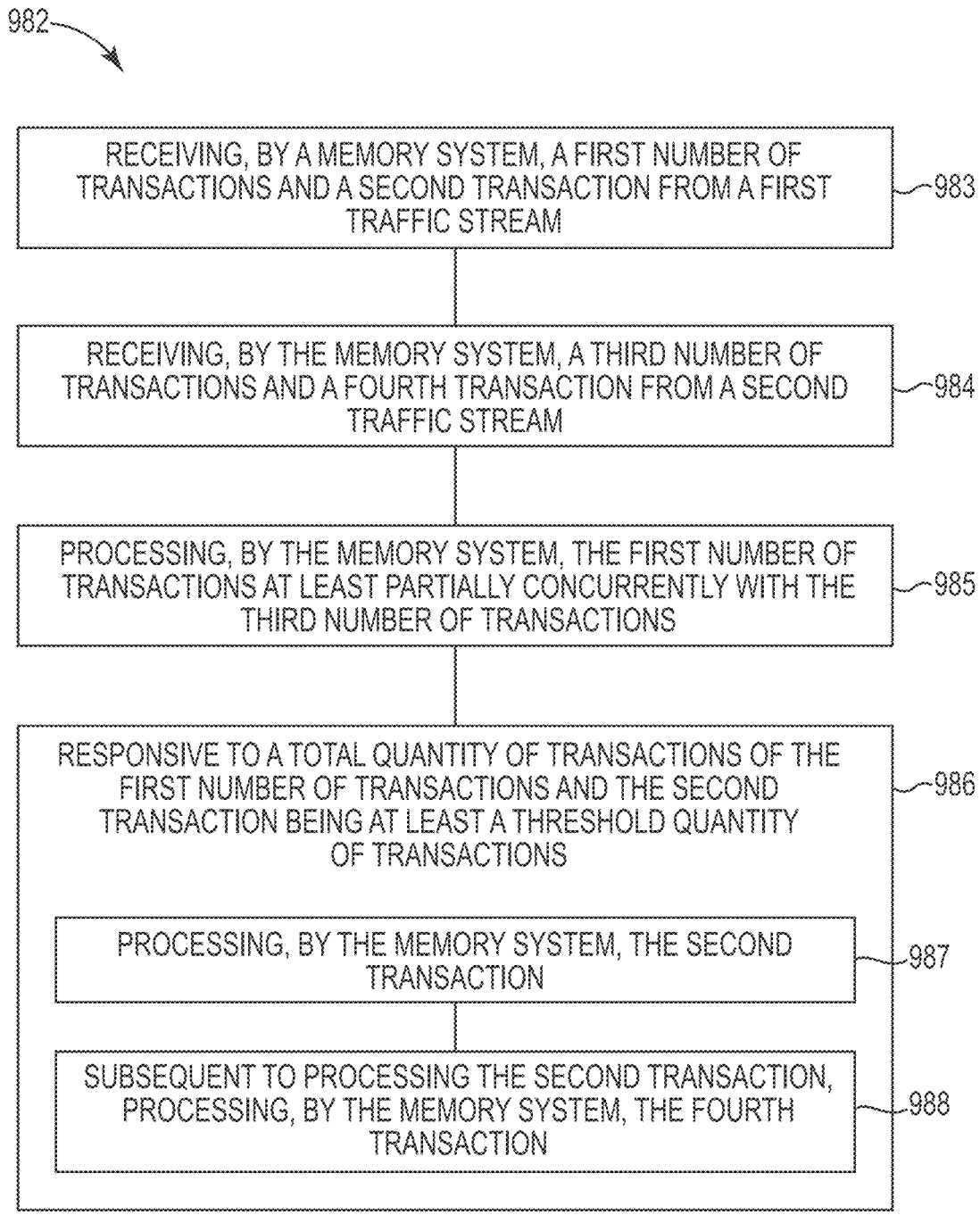
FIG. 9 illustrates an example of a method for port arbitration of a memory system in accordance with a number of embodiments of the present disclosure.

FIG. 9 illustrates an example of a method 1182 for port arbitration in accordance with a number of embodiments of the present disclosure. The method 982 can be performed by processing logic that can include hardware (e.g., processing device, circuitry, dedicated logic, programmable logic, microcode, hardware of a device, integrated circuit, etc.), software (e.g., instructions run or executed on a processing device), or combinations thereof. One or more processes can be omitted in various embodiments. Thus, not all processes are required in every embodiment. Other process flows are possible.

At 983, the method 982 can include receiving, by a memory system, a first number of transactions and a second transaction from a first traffic stream. At 984, the method 982 can include receiving, by the memory system, a third number of transactions and a fourth transaction from a second traffic stream. At 985, the method 982 can include processing, by the memory system, the first number of transactions at least partially concurrently with the third number of transactions. At 986, the method 982 can include, responsive to a total quantity of transactions of the first number of transactions and the second transaction being at least a threshold quantity of transactions, at 987, processing, by the memory system, the second transaction (e.g., exclusively) and, at 988, subsequent to processing the second transaction, processing the fourth transaction by the memory system.

Although not specifically illustrated, the method 982 can include receiving, by the memory system, a fifth transaction from the second traffic stream at least partially concurrent with processing the second transaction. Responsive to the total quantity of transactions being at least the threshold quantity of transactions and subsequent to processing the second transaction, the fifth transaction can be processed, by the memory system, at least partially concurrently with processing the fourth transaction. The method 982 can include responsive to the total quantity of transactions being at least the threshold quantity of transactions, applying backpressure to a port of the memory system that is receiving the second traffic stream. Subsequent to processing the second transaction, the backpressure to the port of the memory system that is receiving the second traffic stream can be released. The method 982 can include determining, by controller of the memory system, whether the total quantity of transactions of the first number of transactions and the second transaction is at least the threshold quantity of transactions.

Although not specifically illustrated, the method 982 can include, subsequent to processing the second transaction, receiving, by the memory system, a fifth transaction from the first traffic stream at least partially concurrently with a sixth transaction from the second traffic stream and determining, by controller of the memory system, whether a different total quantity of transactions of the third number of transactions and the fourth and fifth transactions is at least a different threshold quantity of transactions. Responsive to determining that the different total quantity of transactions is at least the different threshold quantity of transactions, the sixth transaction can be processed (e.g., exclusively) by the memory system and the fifth transaction can be processed, by the memory system, subsequent to processing the sixth transaction.

Figure 10:
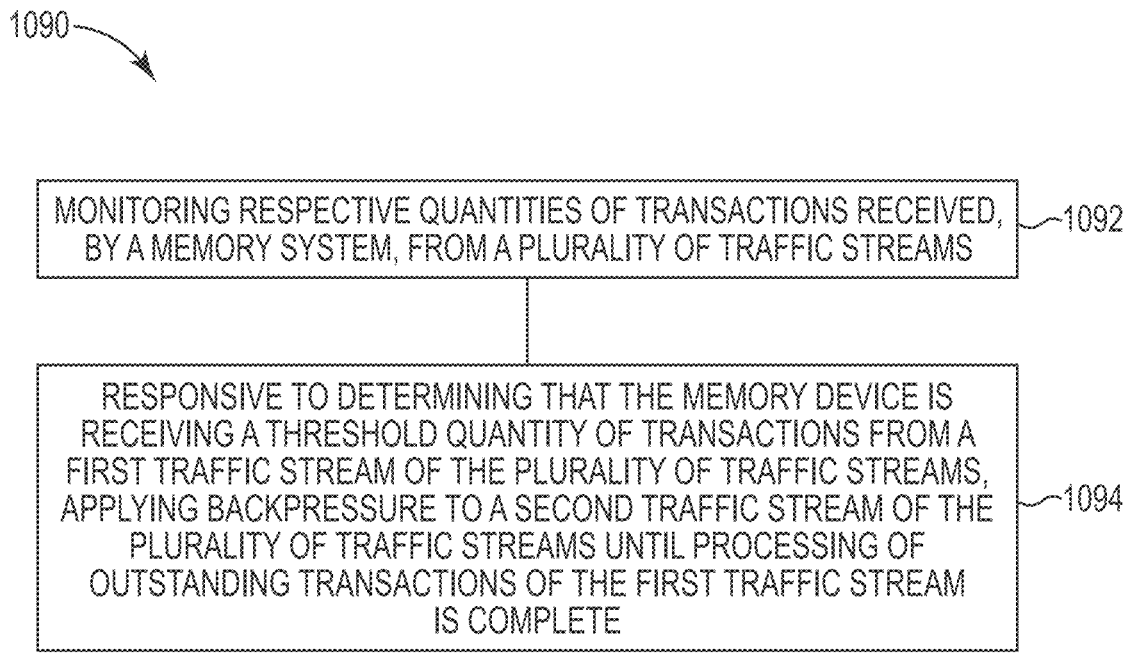
FIG. 10 illustrates an example of a method for port arbitration of a memory system in accordance with a number of embodiments of the present disclosure.

FIG. 10 illustrates an example of a method 1090 for port arbitration in accordance with a number of embodiments of the present disclosure. The method 1090 can be performed by processing logic that can include hardware (e.g., processing device, circuitry, dedicated logic, programmable logic, microcode, hardware of a device, integrated circuit, etc.), software (e.g., instructions run or executed on a processing device), or combinations thereof. One or more processes can be omitted in various embodiments. Thus, not all processes are required in every embodiment. Other process flows are possible.

At 1092, the method 1090 can include monitoring respective quantities of transactions received from a plurality of traffic streams by a memory system. The method 1090 can include determining whether the memory system is receiving transactions from two or more of the plurality of traffic streams concurrently. At 1094, the method 1090 can include, responsive to determining that the memory device is receiving a threshold quantity of transactions from a first traffic stream of the plurality of traffic streams, applying backpressure to a second traffic stream of the plurality of traffic streams until processing of outstanding transactions of the first traffic stream is complete.

Although not specifically illustrated, the method 1090 can include determining whether the memory system is receiving the threshold quantity of transactions from the first traffic stream. The method 1090 can include, responsive to determining that the memory system is not receiving transactions from the first and second traffic streams concurrently and is receiving the threshold quantity of transactions from the first traffic stream, applying backpressure to the second traffic stream until processing of outstanding transactions of the first traffic stream is complete. The method 1090 can include determining whether the memory system is receiving a contention threshold quantity of transactions from the first traffic stream. The method 1090 can include, responsive to determining that the memory device is receiving transactions from the first and second traffic streams concurrently and the contention threshold quantity of transactions from the first traffic stream, applying backpressure to the second traffic stream until processing of outstanding transactions of the first traffic stream is complete. The contention threshold quantity of transactions can be less than the threshold quantity of transactions.

Although specific embodiments have been illustrated and described herein, those of ordinary skill in the art will appreciate that an arrangement calculated to achieve the same results can be substituted for the specific embodiments shown. This disclosure is intended to cover adaptations or variations of various embodiments of the present disclosure. It is to be understood that the above description has been made in an illustrative fashion, and not a restrictive one. Combinations of the above embodiments, and other embodiments not specifically described herein will be apparent to those of skill in the art upon reviewing the above description. The scope of the various embodiments of the present disclosure includes other applications in which the above structures and methods are used. Therefore, the scope of various embodiments of the present disclosure should be determined with reference to the appended claims, along with the full range of equivalents to which such claims are entitled.

In the foregoing Detailed Description, various features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method, comprising:
processing, by a memory system, a first number of transactions from a first traffic stream at least partially concurrently with a second number of transactions from a second traffic stream; and
responsive to a total quantity of transactions of the first number of transactions and a third transaction from the first traffic stream being at least a threshold quantity of transactions, processing, by the memory system, the third transaction exclusively.

2. The method of claim 1, further comprising:
subsequent to processing the third transaction, processing, by the memory system, a fourth transaction from the second traffic stream.

3. The method of claim 1, further comprising
responsive to the total quantity of transactions being at least the threshold quantity of transactions and subsequent to processing the second transaction, processing, by the memory system, a fifth transaction from the second traffic stream at least partially concurrently with processing the fourth transaction.

4. The method of claim 1, further comprising, responsive to the total quantity of transactions being at least the threshold quantity of transactions, applying backpressure to a port of the memory system that is receiving the second traffic stream; and
subsequent to processing the second transaction, release the backpressure to the port of the memory system that is receiving the second traffic stream.

5. The method of claim 1, further comprising:
determining, by a controller of the memory system, whether the memory system is receiving a contention threshold quantity of transactions from the first traffic stream; and
responsive to determining that the memory device is receiving transactions from the first and second traffic streams concurrently and is receiving the contention threshold quantity of transactions from the first traffic stream, applying backpressure to the second traffic stream until processing of outstanding transactions of the first traffic stream is complete.

6. The method of claim 1, further comprising, setting the contention threshold quantity of transactions to less than the threshold quantity of transactions.

7. An apparatus, comprising:
a plurality of memory devices of a memory system; and
a controller coupled to the plurality of memory devices and comprising:
first circuitry configured to determine whether a second data value indicative of a quantity of transactions received by a port of the memory system is greater than or equal to a data value indicative of a threshold quantity of transactions for the port of the memory system;
second circuitry coupled to the first circuitry and configured to:
apply backpressure to the port of the memory system in response to signaling indicative of the second data value being greater than or equal to the first data value; and
release the backpressure to the port in response to different signaling indicative of the second data value less than the first data value.

8. The apparatus of claim 7, wherein the first data value is a data value indicative of a priority of the transactions received by the port of the memory system.

9. The apparatus of claim 7, wherein the first data value is a user-configurable data value.

10. The apparatus of claim 7, wherein the first circuitry comprises an adder configured to:
receive the first and second data values from a first register and a second register, respectively; and
determine whether the second data value is greater than or equal to the first data value.

11. The apparatus of claim 7, wherein the controller is configured to cause:
the second data value, stored by a second register, to be incremented for each transaction received to the port of the memory system; and
the second data value to be decremented for each response to a transaction sent from the port of the memory system.

12. The apparatus of claim 7, wherein the memory system comprises a different port having a different threshold quantity of transactions than the port of the memory system.

13. The apparatus of claim 12, wherein the first data value is based at least in part on a first type of transactions received by the port of the memory system, and
wherein the second data value is based at least in part on a second type of transaction received by the different port of the memory system.

14. The apparatus of claim 12, wherein the port of the memory system has a higher threshold quantity of transactions as compared to the different port of the memory system, and the transactions received at the port of the memory system have a higher priority as compared to the transactions received at the different port of the memory system.

15. An apparatus, comprising:
first port arbitration circuitry associated with a first port of a memory device;
second port arbitration circuitry associated with a second port of the memory device; and
contention circuitry coupled to the first and second ports and configured to determine whether the first and second ports are receiving transactions concurrently,
wherein the first and second port arbitration circuitries each comprise:
a first register configured to store a first data value indicative of a first threshold quantity of transactions for a respective port of the memory system;
a second register configured to store a second data value indicative of a second threshold quantity of transactions for the respective port;
a third register configured to store a third data value indicative of a quantity of transactions received by the respective port;
a multiplexer coupled to the first and second registers and configured to:
select the first data value in response to first signaling, from the contention circuitry, indicative of the first and second ports not receiving transactions concurrently; and
select the second data value in response to second signaling, from the contention circuitry, indicative of the first and second ports receiving transactions concurrently.

16. The apparatus of claim 15, further comprising an adder coupled to the third register and the multiplexer and configured to determine whether the third data value is greater than or equal to the first data value or the second data value selected by the multiplexer.

17. The apparatus of claim 15, further comprising backpressure circuitry configured to apply backpressure to the respective port in response to third signaling indicative of the third data value being greater than or equal to the first data value or the second data value selected by the multiplexer.

18. The apparatus of claim 17, wherein the backpressure circuitry is further configured to release the backpressure to the respective port in response to fourth signaling indicative of the third data value being less than the first data value or the second data value selected by the multiplexer.

19. The apparatus of claim 15, wherein the respective first and second data values for each of the first and second port arbitration circuitries are user-configurable data values, and
wherein the respective first data value is different than the respective second data value.

* * * * *